United States Patent [19] [11] Patent Number: 4,750,168
Trevitt [45] Date of Patent: Jun. 7, 1988

[54] CHANNEL ALLOCATION ON A TIME DIVISION MULTIPLEX BUS

[75] Inventor: Stephen W. Trevitt, Ottawa, Canada

[73] Assignee: Northern Telecom Limited, Montreal, Canada

[21] Appl. No.: 882,554

[22] Filed: Jul. 7, 1986

[51] Int. Cl.<sup>4</sup> ............................ H04J 3/02; H04J 3/16
[52] U.S. Cl. ........................................ 370/85; 370/89
[58] Field of Search ............... 370/85, 89, 86; 371/67, 371/68; 340/825.5

[56] References Cited

U.S. PATENT DOCUMENTS

| | | | |
|---|---|---|---|
| 3,710,351 | 1/1973 | Nakamura | 340/172.5 |
| 3,796,992 | 3/1974 | Nakamura et al. | 340/147 |
| 3,818,147 | 6/1974 | Craft | 340/147 |
| 4,063,220 | 12/1977 | Metcalfe et al. | 340/147 |
| 4,383,315 | 5/1983 | Torng | 340/825 |
| 4,458,314 | 7/1984 | Grimes | 364/200 |
| 4,463,351 | 7/1984 | Chiarottino | 340/825 |
| 4,564,838 | 1/1986 | Boulogne et al. | 340/825 |
| 4,584,575 | 4/1986 | Ryckeboer | 370/85 |

Primary Examiner—Douglas W. Olms
Assistant Examiner—Frank M. Scutch, III
Attorney, Agent, or Firm—Robert C. Hogeboom

[57] ABSTRACT

A novel method and apparatus for quickly allocating channels on a TDM (time division multiplex) bus to devices requesting access to those channels. In one embodiment, each channel of the TDM bus consists of nine bits and each device has a unique eight bit identification code plus one status bit (referred to collectively as a unique nine bit device code). If a channel is not occupied, each device wishing to gain access to the channel applies its own unique nine bit device code to the bus in the channel time period, sequentially, in order to significance. While doing this, each device monitors the bus to determine what code signal is on it; as soon as it detects a code bit differing from its own, it declares a conflict and stops sending its code, only to wait for the occurrence of the next channel when it retries. The device that is successful in applying all the bits of its code to the bus without conflict declares itself to be the winner, and on the next appearance of that channel (i.e. in the next frame) it transmits as the first bit in the channel a status bit set to alert other contenders for the channel that it is taken.

12 Claims, 3 Drawing Sheets

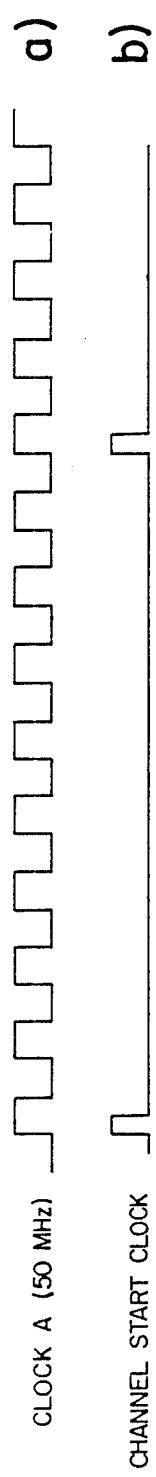
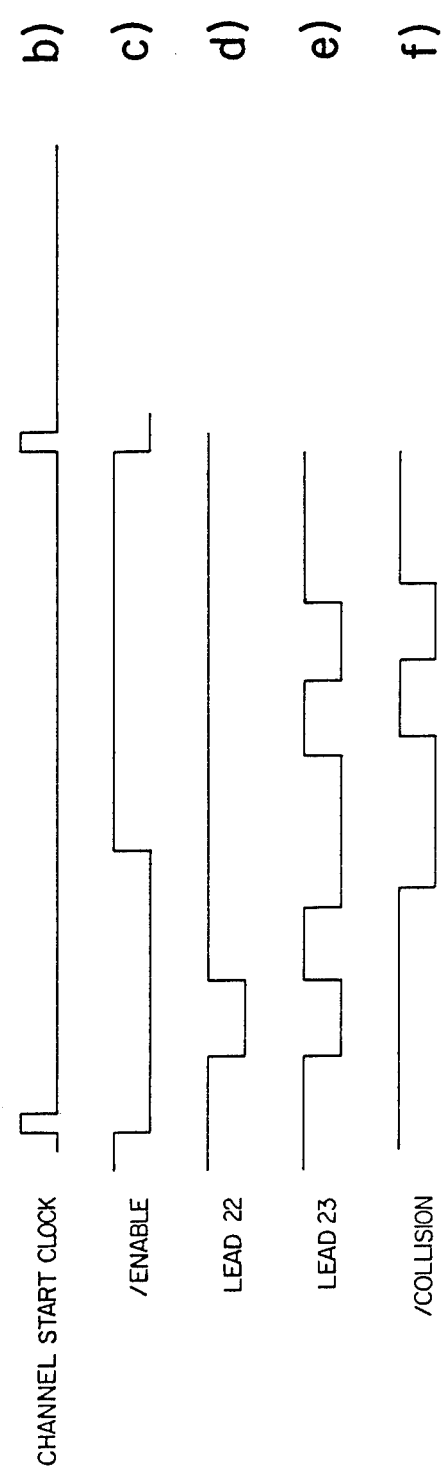
FIG. 2
FIG. 3

CHANNEL ALLOCATION ON A TIME DIVISION MULTIPLEX BUS

This invention relates generally to the field of time division multiplex (TDM) bus systems, and more particularly to the field of resource (i.e. channel) allocation in such a TDM system.

BACKGROUND OF THE INVENTION

Many schemes exist to allocate resources in the field of bus systems; i.e. to assign channels to devices wishing access to the bus. Some schemes relate to allocating a complete bus for the duration of a connection. This can be referred to as time-sharing a bus as opposed to a TDM bus. U.S. Pat. No. 3,710,351 dated Jan. 9, 1973 to N. Nakamura discloses one system for allocating a bus on a time-shared basis. That patent teaches the use of two buses (one for addressing and one for data) and teaches the use of a priority system whereby addresses are compared to determine the priority of access to the data bus. Such a system is described in more detail in aforementioned U.S. Pat. No. 3,710,351 to which attention is directed.

In another scheme, a line (bus) disengagement detecting circuit is used to detect whether or not the line is idle. If the line is idle and a unit wishes to transmit on the line, it transmits a line-use request signal and a signal indicative of the address peculiar to the unit every bit from the highest or lowest place at fixed time intervals. A superposition detector is used to determine whether or not a signal transmitted by the unit has been superimposed on another signal on the bus and priority can be determined by comparing addresses of any competing units. Such a system is described in more detail in U.S. Pat. No. 3,796,992 dated Mar. 12, 1974 by H. Nakamura et al to which attention is directed.

Another scheme is to use a common controller. Each device is arranged to communicate with the common controller on an interrupt basis by issuing requests for access thereto on a common interface or communications channel therewith. Each device has an assigned interrupt number and includes means, effective when issuing a request for access, for comparing such number with other interrupt numbers presented to the interface in connection with conflicting requests for access by other devices in the system. Each device also includes means for proceeding with, or abandoning such request according to the result of such comparison. Such a scheme is described in more detail in U.S. Pat. No. 3,818,447 dated June 18, 1974 by D. J. Craft, to which attention is directed.

Another scheme is known by the tradename "Ethernet". This scheme is somewhat similar to the aforementioned U.S. Pat. No. 3,796,992 except that there is no priority determination. In the Ethernet system, when a station wishes to transmit, the presence of other transmissions on the data bus is detected and transmission is delayed until no other transmissions are detected. Once a transmission is initiated if interference or collision is detected with a transmission initiated at about the sam time by another station, transmission at each station is stopped. A random number generator is employed at each station to determine an interval of time at the completion of which the next attempted transmission will occur so as to resolve the contention for the bus. Such a scheme is described in more detail in U.S. Pat. No. 4,063,220 dated Dec. 13, 1977 by R. M. Metcalfe et al to which attention is directed.

One scheme for seizing an idle time slot in a TDM loop, or ring, communication system is described in U.S. Pat. No. 4,383,315 dated May 10, 1983 by H. C. Torng. Such a scheme uses a master node and other nodes along with statistically determined time delays. Such a scheme is described in more detail in the aforementioned patent to which attention is directed.

U.S. Pat. No. 4,458,314 dated July 3, 1984 by G. J. Grimes discloses a bus sharing scheme for a packet bus employing a separate arbitration bus and a central controller. Each unit (port) has a unique priority code which it synchronously and sequentially applies to the arbitration bus beginning with the most significant digit. After the application of all digits, only the requesting port having the highest code remains in contention and seizes the data bus.

Other patents relating to this general topic and to which attention is directed are as follows: U.S. Pat. No. 4,463,351 dated July 31, 1984 by V. Chiarottino; and U.S. Pat. No. 4,564,838 dated Jan. 14, 1986 by G. F. Boulogne et al.

SUMMARY OF THE PRESENT INVENTION

The present invention is directed to a novel method and apparatus for quickly allocating channels on a TDM (time division multiplex) bus to devices requesting access to those channels.

One example of an application of such a system occurs in digital telephone switching equipment. For example, a TDM bus in a telephone switch may have 512 channels in one frame (125 microsecond time period) and it is desired to allocate those channels amongst 256 devices (e.g. port interconnection crosspoints) that may request access to the bus.

According to one preferred embodiment of the present invention, each channel on the TDM bus consists of nine bits and each device has a unique eight bit identification code plus one status bit. The eight bit identification code together with the status bit is referred to as a unique nine bit device code. The first bit transmitted in each channal is the status bit. If one device has access to the channel in question, it asserts the status bit as its first bit in the channel; this alerts the rest of the devices that the channel is busy and they contend for it no further (i.e. any contention is resolved by the first bit).

If the channel is not occupied, each device wishing to gain access to the channel applies its own unique device code (i.e. status bit plus eight bit identification code) to the bus in the channel time period, beginning with the status bit (not asserted) and continuing with the eight remaining identification code bits, sequentially, in decreasing order of significance. While doing this, each device monitors the bus to determine what code signal is o it; as soon as it detects a code bit differing from its own, it declares a conflict and stops transmsitting its code, only to wait for the occurrence of the next channel when it retries.

The device that is successful in applying all the bits of its device code to the bus without conflict declares itself to be the winner, and on the next appearance of that channel (i.e. in the next frame) it transmits as the first bit in the channel a status bit (asserted) to alert other contenders for the channel that it is taken. The remaining eight bits of the channel are used to transmit binary information. The device can hold that channel until all of its information has been sent, at which time it will no longer assert a status bit at the start of the channel. A device may access more than one channel at a time (i.e. in each frame it may access two or more channels).

BRIEF DESCRIPTION OF THE DRAWINGS

The invention will now be described in more detail with reference to the accompanying drawings wherein like parts in each of the several figures are identified by the same reference character, and wherein:

FIGS. 2, 3 and 4 depict several waveforms useful in understanding the operation of the present invention.

DETAILED DESCRIPTION

Figure 1:
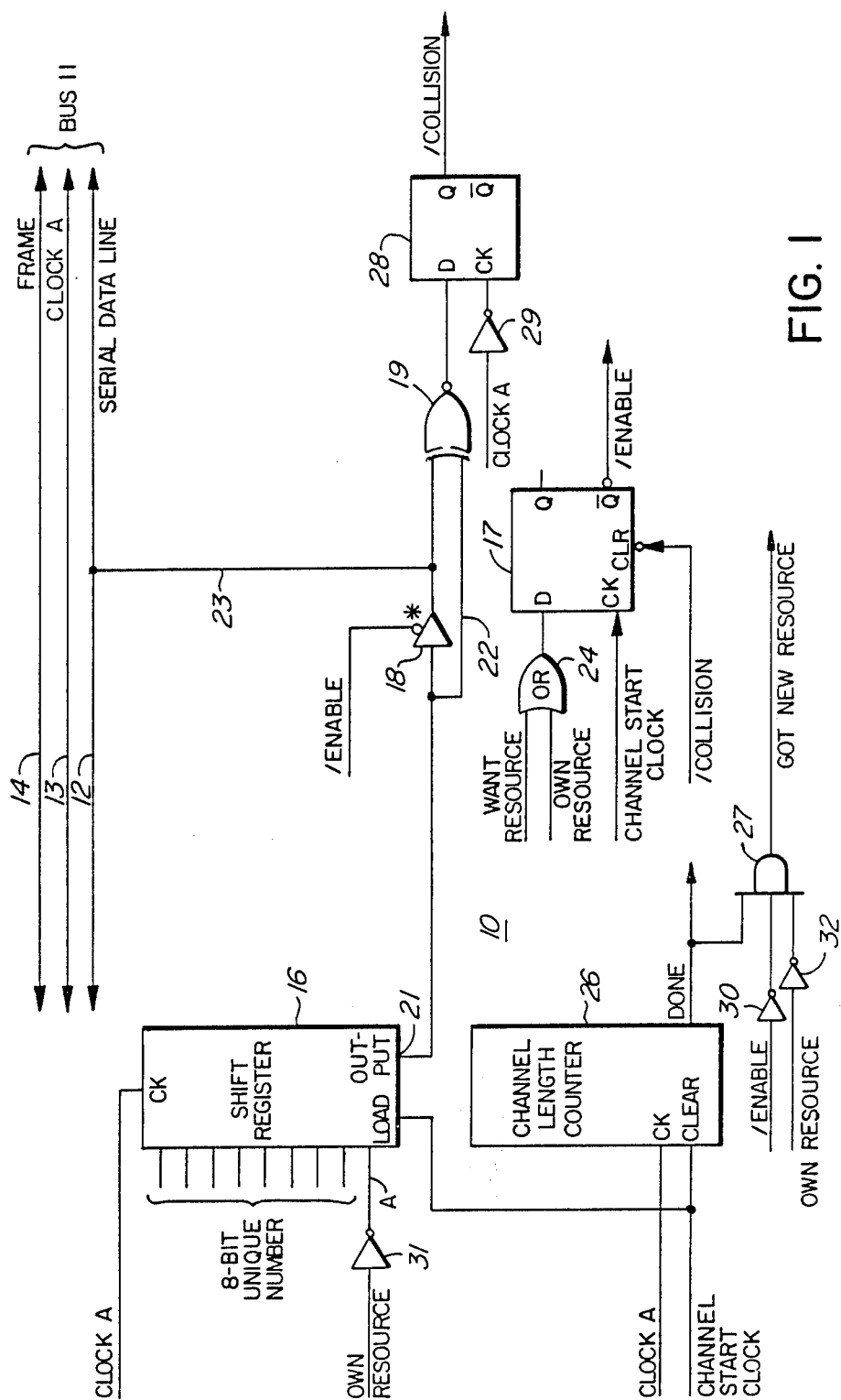
FIG. 1 is a simplified schematic diagram depicting one embodiment of the present invention.

FIG. 1 is a simplified schematic diagram depicting one device 10 connected to TDM bus 11. TOM bus 11 is comprised of serial data line 12, clock lead 13, and frame lead 14. Clock lead 13 carries a 50 MHz clock signal as is depicted in FIG. 2a. Frame lead 14 carries frame pulses, one pulse every 4608 pulses of said clock signal on clock lead 13. TDM bus 11 can have up to 256 devices 10 connected to it and sharing access to it.

Shift register 16 (e.g. a TI 74ALS674 parallel in, serial out) has as its input (in its eight least significant bit positions) an eight bit number identification code unique to this particular device 10. Each device 10, connected to bus 11, will have a different eight bit number (identification code). The ninth input of shift register 16, indicated by the letter A, is selectively a logic 1 or a logic 0 (i.e. a status bit). If device 10 has possession of a channel on bus 11 (of which there are 512 in this embodiment) bit A will be a logic 0 (i.e. status bit asserted) for that channel occurrence, otherwise it will be a logic 1 (i.e. status bit not asserted).

Serial line 12 of bus 11 is normally floating at a logic 1 level (i.e. approximately +5 volts) when not in use (i.e. when idle). When device 10 wishes to gain access to a channel on serial data line 12 to transmsit information, it asserts the signal "want resource" applied to the D input of flip-flop 17 via OR gate 24. When clocked by the "channel start clock" signal being applied to the clock (CK) input of flip-flop 17, the "/Enable" signal on the $\overline{Q}$ output of flip-flop 17 is asserted and driver 18 (e.g. 7407), which is open collector, is turned on so as to allow the contents of shift register 16 to be applied both to serial data line 12 (via lead 23) and to one input of Exclusive-NOR gate 19 (e.g. 74LS286).

When this happens, the contents of shift register 16 appear sequentially at output 21 of shift register 16 and are consequently applied sequentially both to line 12 (via lead 23) and to gate 19 (via lead 22 and via driver 18) in order of decreasing significance. As serial data line 12 normally floats at a logic 1 level (approximately +5 volts) if device 10 applies a logic 1, line 12 is unchanged. If device 10 applies a logic 0, line 12 changes to a logic 0. Note that in this arrangement, that a logic 0 is dominant over a logic 1; that is, if two devices 10 are both applying two different value logic signals to line 12, line 12 will carry logic 0.

As a result, Exclusive-NOR gate 19 is actually comparing the logic value of the bits output from shift register 16 (on lead 22) with the logic value of the bits carried on line 12 (via lead 23). In other words, if the output of shift register 16 is a logic 0 then the signal carried by line 12 of bus 11 will be a logic 0 regardless of what value any other device 10 attempts to apply to line 12. However, if shift register 16 applies a logic 1 to line 12 of bus 11, bus 11 will carry a logic 1 if and only if no other device 10 is applying a logic 0 (i.e. either no other device 10 is vying for the bus, or the other devices 10 are also applying a logic 1 signal).

If the two inputs (on leads 22 and 23) to Exclusive-NOR gate 19 are different, then the signal "/Collision" is asserted. Flip-flop 17 is cleared and driver 18 is turned off via the /Enable signal. Shift register 16 continues to cycle through its data, but that data is not applied to data line 12 since driver 18 is turned off. When the next channel begins, as indicated by the channel start clock pulse, the process starts anew.

If device 10 is successful in acquiring access to bus 11 (i.e. it successfully applies all of its nine bits, from register 16, without Flip-flop 28 asserting the signal /Collision) then the A-bit of register 16 is set to a logic 0 for that channel only (i.e. the status bit is asserted). When the channel on line 12 that was claimed next appears, the first bit on it will be bit A (i.e. the status bit set at a logic 0) from register 16. This acts as a busy bit and will cause any other devices 10 that may be vying for access to that channel to stop after the first bit, because they will have detected a collision.

On completion of the channel (i.e. after 9 bits), the signal "Done" (FIG. 4g) is asserted by channel length counter 26 and applied to one input of AND gate 27. The other inputs to gate 27 are the /Enable signal inverted by inverter 30 and the "Own Resource" signal inverted by inverter 32. The output of AND gate 27 is the signal "Got New Resource" (indicative of access to the channel being contended for).

Figure 4:
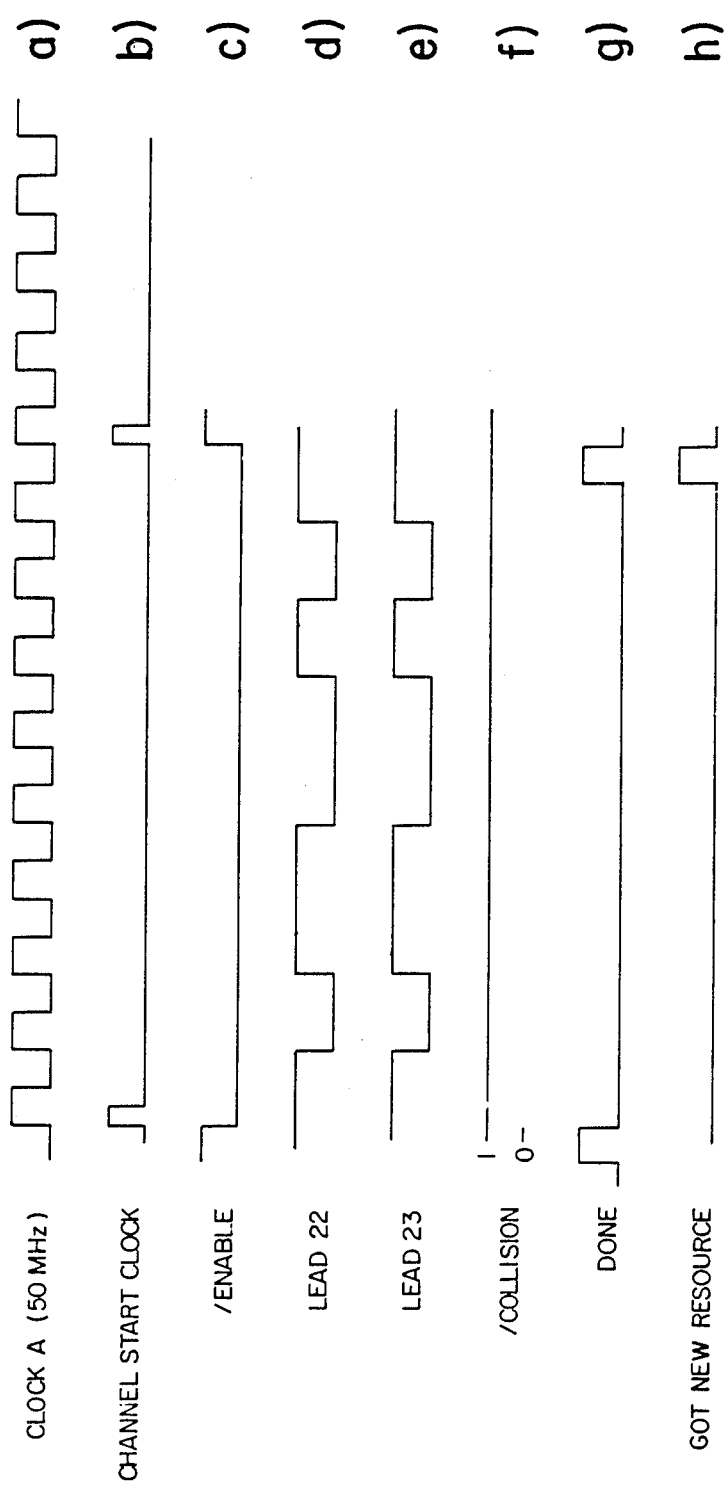

The operation of the circuitry of device 10 will be better appreciated by reference to the FIGS. 2, 3 and 4 which depict waveforms useful in understanding the operation of device 10. Note that FIG. 2, comprising parts a and b, depicts two clocks used by device 10. FIG. 3, comprising parts a to f, depicts the signals for one illustrative operation of device 10 when it fails to gain access to bus 11 (i.e. it fails to get new resource).

FIG. 4, comprising parts a to h, depicts the signals for one illustrative operation of device 10 wherein it succeeds in gaining access to bus 11 (i.e. it succeeds in getting new resource). Consequently, the /Enable signal (FIG. 4c) is asserted for the whole channel and the signal /Collision (FIG. 4f) is not asserted for any of the channel. The signals "Done" and "Got New Resource" are also depicted in FIG. 4.

In subsequent occurrences of the accessed channel, information (data) can be transmitted by replacing the eight-bit identification code applied to shift register 16 with eight bits of data to be sent. Alternatively, a separate circuit (not shown) can be used to send the data, once the arbitration for the channel has been settled.

While the present invention has been described in the context of negative logic signals, where a logic 0 signal has dominance on bus 11 over a logic 1 signal, positive logic could also be used wherein a logic 1 signal would have dominance over a logic 0 signal.

It should be noted that the system as described gives priority to devices 10 having certain identification codes. A device 10 having an identification code of all zeros would have maximum priority; any device IO having an identification code with zero in its most significant bit location would have priority over those that don't, etc.

In certain circumstances this type of priority may be desired. In other circumstances it may not matter whether priority exists or not. In still other circumstances, such a priority system may actually be considered a disadvantage. Clearly, if every device 10 were required to have equal access to bus 11 then one would want an access scheme having no priority. One way to provide such a no priority scheme with the present invention is to increase (or decrement) the unique identification code carried by each device 10 on a regular basis (e.g. increase it by one bit every frame). This way, while the devices IO have, at any given instant in time a certain priority, over a sufficiently long time period the priority averages out to be equal for all device 10.

One method of doing this is to have the eight bit identification code generated by a counter (not shown). Frame lead 14 loads the counter with an eight bit unique code once every 125 microseconds. This code does not vary in time. The counter is incremented at the beginning of each channel time (i.e. via the "channel start clock" signal). As all counters in all devices 10 are incremented at the same time, the code for each device 10 is still unique, but changes with time. In one frame (i.e. 125 microseconds), the unique code for each device 10 will cycle through all possible combinations (256), twice.

What is claimed is:

1. A method of allocating channels on a serial time division multiplex (TDM) bus between a plurality of devices, said method characterized by:
   assigning a unique device code to each of said plurality of devices;
   each said device, requesting use of a channel, applying its said code to said bus, one bit at a time, starting at the start of said channel;
   each said device monitoring said bus and comparing any signal on said bus to its own unique code;
   wherein, if the result of said comparison is that said signal on said bus is identical to said code, said device declares itself the owner of said channel and in the first bit of successive appearances of said channel sets a status bit to indicate that said channel is occupied and is not available to any other device; and
   if the result of said comparison is that the signal on said bus is not identical to said code, said device declares itself not the owner of said channel and stops transmitting on said channel.

2. The method of claim 1 wherein said unique device code is a nine bit binary number, different for each device.

3. The method of claim 1 wherein said device code is comprised of a status bit followed by a unique identification code.

4. A method of allocating channels in a time division multiplex (TDM) bus amongst a plurality of devices in communication with said bus, said method characterized, at each said device, by the steps of:
   (a) applying to a given channel of said TDM bus, bit serially, a unique binary code;
   (b) monitoring said TDM bus and comparing said bits received from said bus with said bits of said unique binary code;
   (c) stopping the application of any remaining constituent bits of said unique binary code when the comparison between the bits of said unique code and the bits on said TDM bus is not the same; and
   (d) setting the first bit to be applied to said TDM bus at the start of successive occurrences of said given channel to a predetermined logic value if all the bits from said unique binary code have been the same as said corresponding bits o said TDM bus for the duration of said given channel.

5. The method of claim 4 wherein said unique binary code is comprised of nine bits.

6. The method of claim 4 wherein said TDM bus is a serial bus.

7. The method of claim 4 wherein said monitoring is accomplished by an Exclusive-NOR logic gate.

8. A device for connection to a time division multiplex (TDM) bus for selectively accessing a given channel of said bus, said device characterized by:
   storage means for storing a unique device code;
   first means for selectively applying said unique device code to said bus;
   comparison means for comparing any signals carried by said bus with the output from said storage means and for producing a comparison signal indicative of the results of said comparison;
   said first means responsive to said comparison signal to stop the further transmission of said unique device code if a mismatch is detected.

9. The device of claim 8 wherein said TDM bus is a serial bus.

10. The device of claim 8 wherein said unique device code is a nine bit binary number.

11. The device of claim 8 wherein said comparison means comprises an Exclusive-NOR logic gate.

12. The device of claim 8 wherein said unique device code is comprised of at least one status bit followed by a unique identification code.

* * * * *